US009377184B2

(12) United States Patent
Chang

(10) Patent No.: US 9,377,184 B2
(45) Date of Patent: Jun. 28, 2016

(54) LIGHT BULB HOLDER MODULE WITH FUNCTION OF SHARING WIRELESS NETWORK

(71) Applicant: Nai-Chien Chang, New Taipei (TW)

(72) Inventor: Nai-Chien Chang, New Taipei (TW)

(*) Notice: Subject to any disclaimer, the term of this patent is extended or adjusted under 35 U.S.C. 154(b) by 652 days.

(21) Appl. No.: 13/673,604

(22) Filed: Nov. 9, 2012

(65) Prior Publication Data

US 2013/0121390 A1    May 16, 2013

(30) Foreign Application Priority Data

Nov. 11, 2011   (TW) ............................. 100221376 U

(51) Int. Cl.
| *H02J 1/00* | (2006.01) |
| *H02J 3/00* | (2006.01) |
| *F21V 23/04* | (2006.01) |
| *H04L 12/28* | (2006.01) |
| *H04W 88/08* | (2009.01) |
| *F21S 8/02* | (2006.01) |

(52) U.S. Cl.
CPC .......... *F21V 23/0435* (2013.01); *H04L 12/282* (2013.01); *H04W 88/08* (2013.01); *F21S 8/026* (2013.01)

(58) Field of Classification Search
CPC ... H04L 12/10; H04L 12/40045; H04L 12/12; H04L 12/413; H04L 12/2816; H04L 12/2838; H04L 12/403; H04L 12/44; H04L 12/4625; H04L 2012/2843; H04L 2012/2845; H04L 2012/285; H04L 2012/40221

USPC ............................................................ 307/1
See application file for complete search history.

(56) References Cited

U.S. PATENT DOCUMENTS

| 7,162,258 | B2* | 1/2007 | Beach ................ H05B 37/0272 370/217 |
| 7,976,461 | B2* | 7/2011 | Ertas .................. A61B 1/00059 600/101 |
| 8,033,686 | B2* | 10/2011 | Recker ............... H05B 33/0803 362/249.02 |
| 8,339,247 | B2* | 12/2012 | Adamson ........... H05B 37/0272 340/13.26 |
| 8,893,968 | B2* | 11/2014 | Jonsson ............... G06Q 10/087 235/375 |
| 2011/0006896 | A1* | 1/2011 | Barnett .............. H05B 37/0272 340/565 |

* cited by examiner

*Primary Examiner* — Jared Fureman
*Assistant Examiner* — Esayas Yeshaw
(74) *Attorney, Agent, or Firm* — Muncy, Geissler, Olds & Lowe, P.C.

(57) ABSTRACT

A light bulb holder module with a function of sharing wireless network is disclosed. The light bulb holder module is embedded into a light bulb slot and is externally connected to a light bulb. The light bulb holder module includes a light bulb holder, an electronic switch, a control unit, a network input port, a wireless transmission chip, and an antenna unit. The network input port is connected to a modem via a network wire to receive network services. The wireless transmission chip receives and converts network signals and then transmits the network signals out via the antenna unit. The wireless transmission chip is electrically connected to the control unit so that external control signals are received by the wireless transmission chip and controlled by the control unit to control the electronic switch to be turned on or turned off, thus lightening or extinguishing the light bulb.

8 Claims, 5 Drawing Sheets

LIGHT BULB HOLDER MODULE WITH FUNCTION OF SHARING WIRELESS NETWORK

This application is based on and claims the benefit of Taiwan Application No. 100221376 filed Nov. 11, 2011 the entire disclosure of which is incorporated by reference herein.

BACKGROUND

1. Technical Field

The present disclosure relates generally to a light bulb holder module, and more particularly to a light bulb holder module with a function of sharing wireless network.

2. Description of Related Art

With the development of the semiconductor industry, various electronic devices, such as computers, tablet computers, smart mobile devices, personal digital assistants, and so on, are prevalent. Also, the electronic devices have powerful functions, features, and abilities which are built therein. Accordingly, the electronic devices cannot be separated from the scope of work or entertainment for users.

For the electronic devices, one of the most important features is the network connection. Hence, how to make the electronic devices successfully connected to the Internet is the most important consideration for users. In general, the users have to apply for network services to network operators. And then a modem (not shown) is used to connect to the Internet Service Provider (ISP). The modem can be connected to a wireless network router 3 (also referred to as the access point, AP) to transmit network signals out, thus sharing the wireless network. As a result, the user can operate and control an electronic apparatus 30 to connect to the wireless network router 3 by the wireless network, thus receiving the network services. For wireless networks, however, how to reduce obstruction of transmitting signals and increase quality of connecting wireless network are also the important considerations. If there are too many obstacles are located between the electronic apparatus 30 and the wireless network router 3, the connection signals are possibly low to influence the connection speed, stability, and even may be unable to successfully connect.

In general, the least affected from obstructions in a residential location is the ceiling. Also, a light bulb slot 1 is usually installed in the ceiling. The light bulb slot 1 is connected to the utility power via a button switch 10 and the light bulb 2 is embedded into the light bulb slot 1. Also, the light bulb 2 is electrically connected to the utility power via the light bulb slot 1. Accordingly, the light bulb 2 can receive electricity from the utility power to be lightened when the button switch 10 is turned on.

Accordingly, the wireless network router 3 is installed in the ceiling and the light bulb slot 1 and the light bulb 2 are integrated to provide the optimal network connection quality to meet the demands of users.

SUMMARY

An object of the present disclosure is to provide a light bulb holder module with a function of sharing wireless network to solve the above-mentioned problems. Hence, the light bulb holder module is connected to a modem to receive network services. Further, the light bulb holder module provides a wireless transmission chip and an antenna unit which are built in the light bulb holder module in a better position to share wireless network, thus providing the optimal network connection quality.

In order to achieve the above-mentioned object, the light bulb holder module is embedded into a light bulb slot and is externally connected to a light bulb. The light bulb holder module includes a light bulb holder, an electronic switch, a control unit, a network input port, a wireless transmission chip, and an antenna unit. The light bulb can be assembled in and disassembled from the light bulb holder. The network input port is connected to a modem via a network wire to receive network services. Also, the wireless transmission chip receives and converts network signals and then transmits the network signals out via the antenna unit to provide the function of sharing wireless network. In addition, the wireless transmission chip is electrically connected to the control unit so that external control signals are received by the wireless transmission chip and controlled by the control unit to control the electronic switch to be turned on or turned off, thus lightening or extinguishing the light bulb.

The better effectiveness of the present disclosure is described as follows. The light bulb holder module is connected between the light bulb slot and the light bulb. Also, the electronic switch inside the light bulb holder module can be turned on or turned off by wireless signals, thus lightening or extinguishing the light bulb. In addition, the light bulb holder module is provided to connect the modem so that the network wires can be buried in the ceiling, thus overcoming the problem of excessive and cluttered wires and poor visual perception due to the exposed wires. Furthermore, the built-in wireless transmission chip and antenna unit are used to process network signals and the processed network signals are transmitted out after the light bulb holder module receives network services via the modem, thus providing the function of sharing wireless network. If the light bulb holder module is embedded into the light bulb slot disposed on the ceiling, the light bulb holder module can provide the optimal connection quality due to the optimal location.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
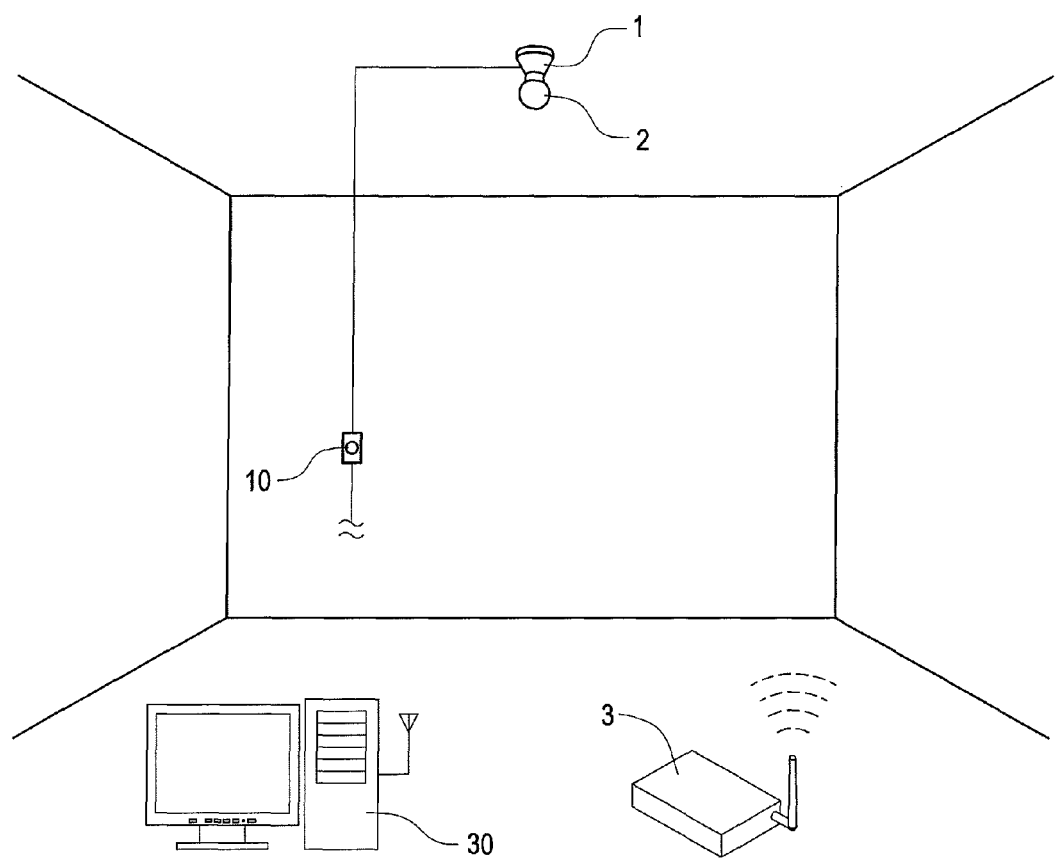
FIG. 1 is a schematic view of the related art configuration.

Reference will now be made to the drawing figures to describe the present invention in detail.

Figure 2A:
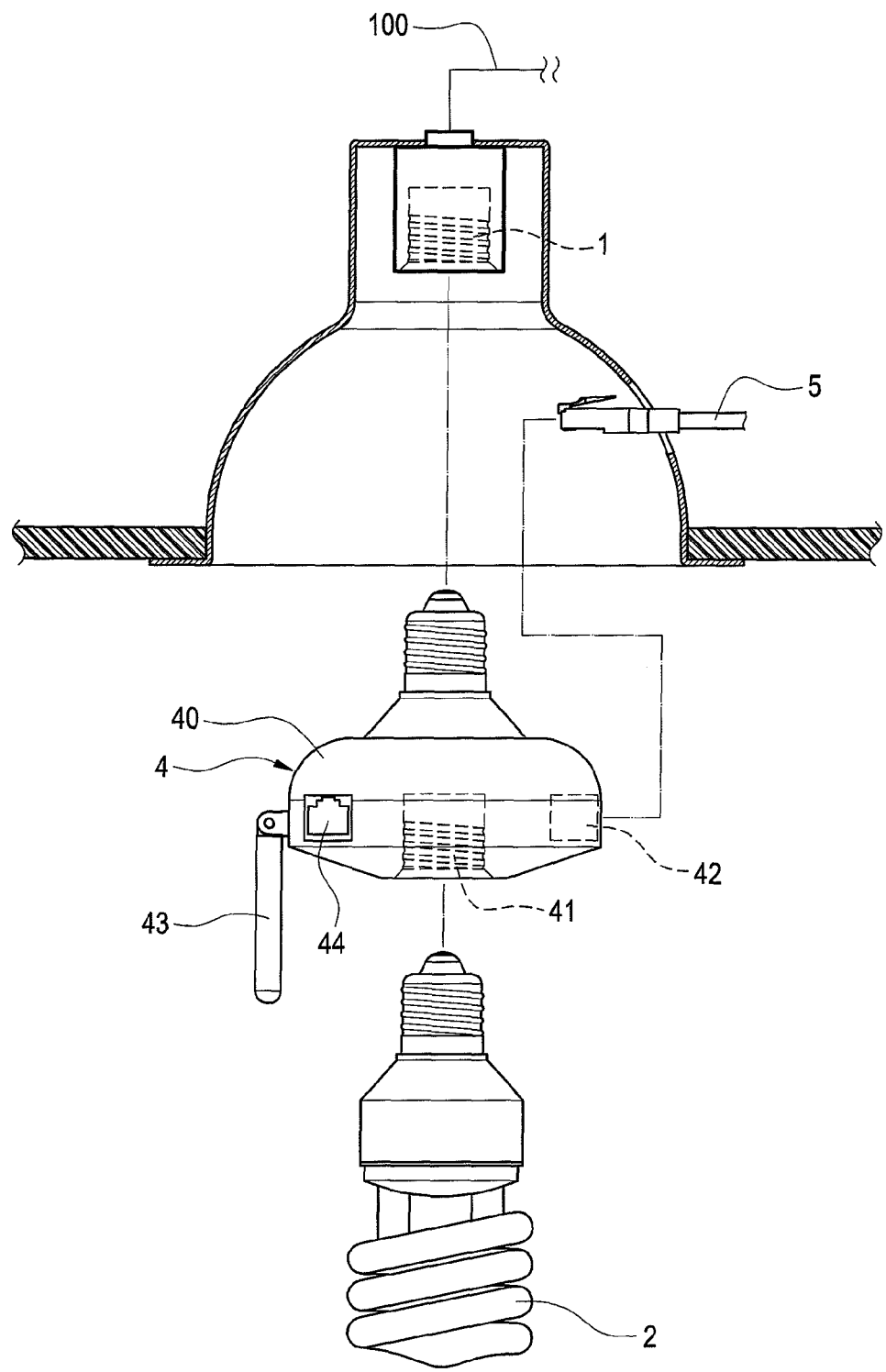
FIG. 2A is a schematic view of before embedding a light bulb holder module according to a preferred embodiment of the present disclosure.
Figure 2B:
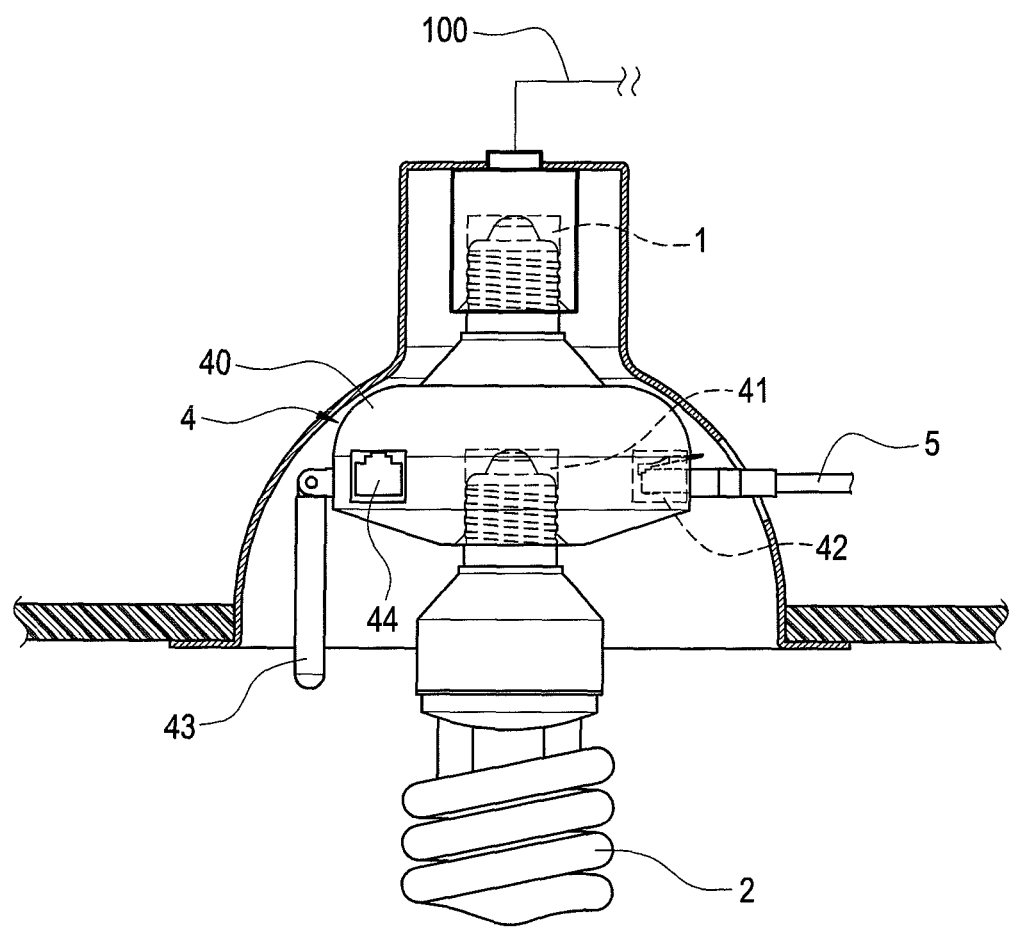
FIG. 2B is a schematic view of after embedding the light bulb holder module according to the preferred embodiment of the present disclosure.

Reference is made to FIG. 2A and FIG. 2B which are a schematic view of before embedding and after embedding a light bulb holder module according to a preferred embodiment of the present disclosure. In general, the retained electric lines of configuring lamps are usually buried in the ceiling of a building. Hence, a light bulb 2 is installed on a light bulb slot 1 to be supplied via a utility power.

A light bulb holder module with a function of sharing wireless network (referred to as a light bulb holder module 4 hereinafter) is embedded into a light bulb slot 1 and also can be disassembled. The light bulb holder module 4 provides a light bulb holder 41 so that the light bulb 2 is installed on the light bulb holder 41 and electrically connected to a utility power 100 (as shown in FIG. 3) to be supplied power via the light bulb holder module 4 after the light bulb holder module 4 is embedded into the light bulb slot 1.

The utility power 100 is connected to the light bulb slot 1 via a button switch 10. When the button switch 10 is turned on, the light bulb holder module 4 can receive electricity via the light bulb slot 1 to lighten the light bulb 2. On the contrary, the light bulb holder module 4 cannot receive electricity so that the light bulb 2 is extinguished when the button switch 10 is turned off.

The light bulb holder module 4 further has a network input port 42 and an antenna unit 43. The network input port 42 is exposed to a light bulb housing 40 of the light bulb holder module 4 and the antenna unit 43 is directly installed outside the light bulb housing 40. Users can bury a network wire 5 in the ceiling and the network input port 42 can be aimed at the network wire 5 and then conveniently inserted in the network wire 5 when the light bulb holder module 4 is embedded into the light bulb slot 1. As a result, the network wire 5 is not exposed and therefore does not affect visual perception.

Figure 3:
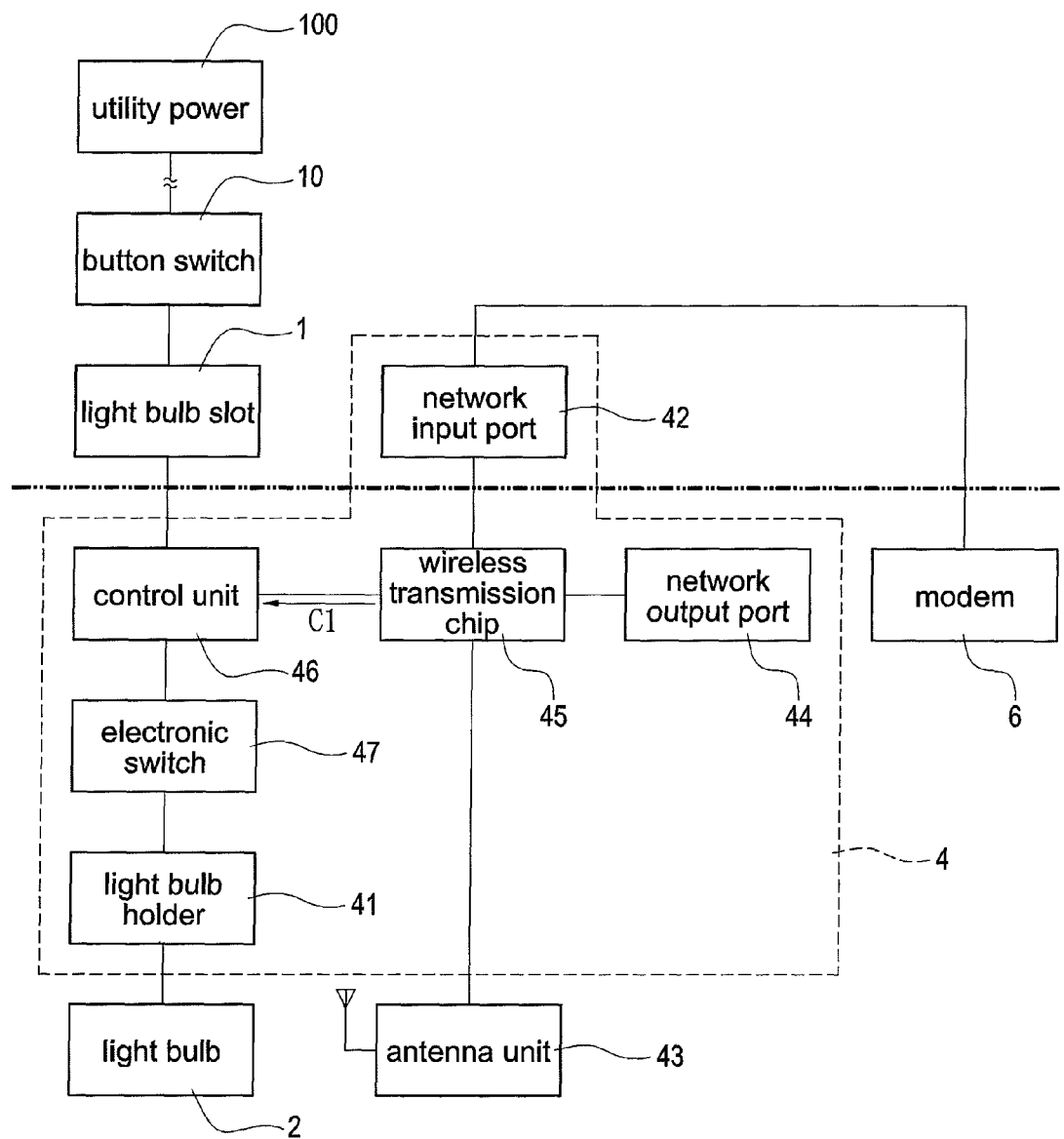
FIG. 3 is a block diagram of the light bulb holder module according to a preferred embodiment of the present disclosure.

Another terminal of the network wire 5 can be connected to a modem 6 (as shown in FIG. 3) so that the light bulb holder module 4 can accept network services via the modem 6. In addition, the light bulb holder module 4 receives network signals and the received signals are processed inside the light bulb holder module 4, and then the processed network signals are transmitted out via the antenna unit 43. Hence, the light bulb holder module 4 can be used as a wireless network router (also referred to as the access point, AP) to provide a function of sharing wireless network. As for the detailed operation of the light bulb holder module 4 will be described as follows.

As mentioned above, the wireless network router is installed in the light bulb slot 1 on the ceiling so that the optimal connection quality can be provided. Also, power wire electrically connected to the utility power 100 of the wireless network router and the network wire 5 are all buried in the ceiling to overcome the problem of excessive and cluttered wires and therefore does not affect visual perception.

Reference is made to FIG. 3 which is a block diagram of the light bulb holder module according to a preferred embodiment of the present disclosure. The light bulb holder module 4 includes the light bulb holder 41, the network input port 42, the antenna unit 43, a wireless transmission chip 45, a control unit 46, and an electronic switch 47. The electronic switch 47 is electrically connected to the control unit 46 and the light bulb holder 41. The wireless transmission chip 45 is electrically connected to the network input port 42, the antenna unit 43, and the control unit 46. The light bulb housing 40 is provided to cover the light bulb holder 41, the network input port 42, the wireless transmission chip 45, the control unit 46, and the electronic switch 47. The network input port 42 is exposed to a surface of the light bulb housing 40 to conveniently connect to the network wire 5. In addition, the antenna unit 43 is directly installed outside the light bulb housing 40 to provide a good transmission effect.

The network input port 42 is connected to the network wire 5 and further connected to the modem 6 via the network wire 5. A connection between the wireless transmission chip 45 and the modem 6 is established via the network input port 42 and the network wire 5 to receive the network service via the modem 6. Hence, the wireless transmission chip 45 receives network signals and processes the network signals. In this embodiment, the network input port can be a RJ-45 connector and the wireless transmission chip 45 can be a wireless fidelity (Wi-Fi) transmission chip. However, the embodiments are only exemplified but are not intended to limit the scope of the disclosure.

The antenna unit 43 receives the network signals processed by wireless transmission chip 45 and transmits the network signals out. Accordingly, the light bulb holder module 4 can provide a function of sharing wireless network that is users can use the light bulb holder module 4 as a wireless network router. More specifically, an external electronic apparatus (as the electronic apparatus 7 shown in FIG. 4) can establish a wireless connection to the light bulb holder module 4 via the antenna unit 43 and then the light bulb holder module 4 is connected to the modem 6 so that the light bulb holder module 4 can accept the network services via the modem 6. The light bulb holder module 4 is electrically connected to the light bulb slot 1 via the control unit 46. The control unit 46 receives the utility power 100 via the light bulb slot 1 to supply power. Accordingly, the light bulb holder module 4 can obtain the required electricity to provide the function of sharing wireless network without external power sources or built-in batteries. In addition, the control unit 46 is connected to the light bulb 2 via the electronic switch 47 and the light bulb holder 41 so that the light bulb 2 can receive electricity produced from the utility power 100 via the light bulb holder module 4.

Especially, the light bulb holder module 4 can receive a control signal C1 via the antenna unit 43 and then the received control signal C1 is transmitted to the control unit 46 to be processed. Note that, the control signal C1 is a command of controlling the light bulb 2. After the control unit 46 receives the control signal C1, the control unit 46 can control the electronic switch 47 to be turned on or turned off according to the content of the control signal C1, thus lightening or extinguishing the light bulb 2. In this embodiment, the electronic switch 47 can be a relay. However, the embodiment is only exemplified but is not intended to limit the scope of the disclosure.

Especially, the light bulb holder module 4 further includes a network output port 44. The network output port 44 is electrically connected to the wireless transmission chip 45 and the network output port 44 is covered by the light bulb housing 40 and exposed to a surface of the light bulb housing 40.

Figure 4:
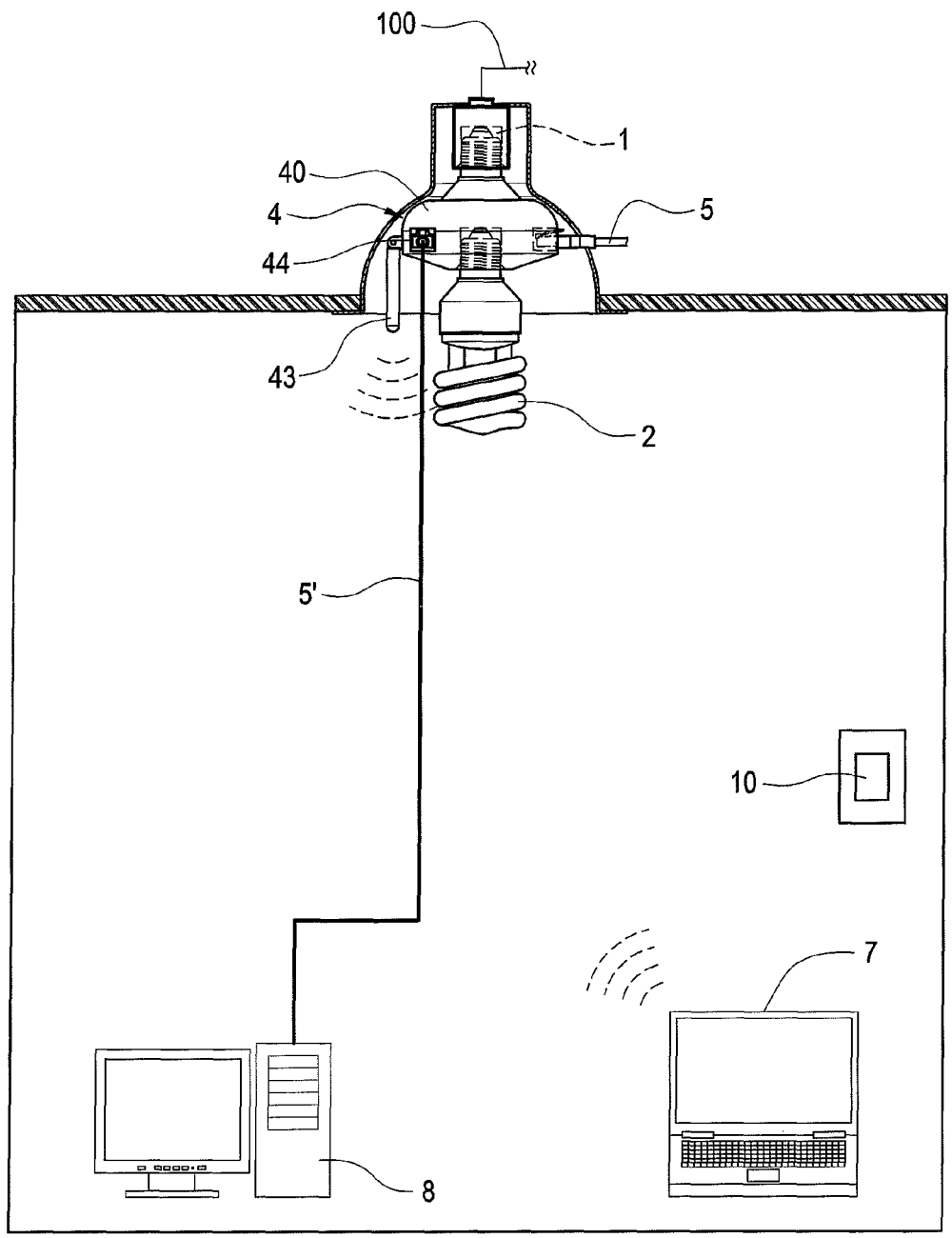
FIG. 4 is a schematic view of the configuration according to the preferred embodiment of the present disclosure.

Reference is made to FIG. 4 which is a schematic view of the configuration according to the preferred embodiment of the present disclosure. The network output port 44 is further externally connected to another network wire 5' and connected to an external electronic apparatus 8 via the network wire 5', thus providing a function of sharing wired network to the electronic apparatus 8. In this embodiment, the network output port 44 can also be a RJ-45 connector. However, the embodiment is only exemplified but is not intended to limit the scope of the disclosure.

Hence, the light bulb holder module 4 can provide both functions of sharing wireless network and wired network. The electronic apparatus 7 can be connected to the light bulb holder module 4 by the wireless network and the electronic apparatus 8 can be connected to the light bulb holder module 4 by the network wire 5' (wired network), respectively. More specifically, uses can operate the electronic apparatus 7 or the electronic apparatus 8 to transmit the control signal C1 to lighten or extinguish the light bulb 2. Also, the light bulb holder module 4 can receive the control signal C1 via the antenna unit 43 and/or the network output port 44 and the received control signal is transmitted to the control unit 46 to be processed. Accordingly, the control unit 46 can control the electronic switch 47 to be turned on or turned off according to the content of the control signal C1, thus lightening or extinguishing the light bulb 2.

Because of design of the light bulb holder module 4, the power wires and the network wire 5, 5' are buried in the ceiling so as to the problem of excessive and cluttered wires. In addition, the wireless network router can be disposed on the ceiling to reduce obstruction of transmitting signals and increase quality of connecting wireless network.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A light bulb holder module with a function of sharing wireless network embedded into a light bulb slot installed on a ceiling of a building and can be disassembled, the light bulb holder module comprising:
    a network input port connected to an external modem via a network wire;
    a wireless transmission chip electrically connected to the network input port and connected to the modem via the network input port, wherein the modem is configured to receive network services and the wireless transmission chip is configured to process network signals;
    an antenna unit electrically connected to the wireless transmission chip and configured to receive the processed network signals from the wireless transmission chip and transmit the received network signals out, thus providing the function of sharing wireless network and providing the light bulb holder module to be used as a wireless access point (AP);
    a control unit electrically connected to the wireless transmission chip, the light bulb holder module electrically connected to the light bulb slot via the control unit and the light bulb slot configured to receive electricity produced from the utility power;
    an electronic switch electrically connected to the control unit;
    a light bulb holder electrically connected to the electronic switch, the light bulb holder module connected to an external light bulb via the light bulb holder, wherein the light bulb is configured to receive the electricity via the light bulb holder module; and
    a light bulb housing configured to cover the network input port, the wireless transmission chip, the control unit, the electronic switch and the light bulb holder, wherein the network input port is exposed to a surface of the light bulb housing for connecting the network wire, the antenna unit is installed outside of the light bulb housing, and the light bulb holder is exposed to the surface of the light bulb housing for connecting with the light bulb outside of the light bulb housing;
    wherein the light bulb holder module receives the external control signal via the antenna unit outside of the light bulb housing and the received control signal is transmitted to the control unit to be processed so that the control unit automatically controls the electronic switch inside of the light bulb housing to be turned on or turned off according to the content of the control signal, thus lightening or extinguishing the light bulb.

2. The light bulb holder module in claim 1, wherein the electronic switch is a relay.

3. The light bulb holder module in claim 1, wherein the network input port is a RJ-45 connector.

4. The light bulb holder module in claim 3, wherein the wireless transmission chip is a wireless fidelity (Wi-Fi) transmission chip.

5. The light bulb holder module in claim 1, the light bulb holder module further comprising:
    a network output port electrically connected to the wireless transmission chip, wherein the network output port is connected to an external electronic apparatus via a network wire, thus providing the function of sharing wired network.

6. The light bulb holder module in claim 5, wherein the network output port is a RJ-45 connector.

7. A light bulb holder module with a function of sharing wireless network embedded into a light bulb slot installed on a ceiling of a building and can be disassembled, the light bulb holder module comprising:
    a network input port connected to an external modem via a network wire, wherein the network input port is a RJ-45 connector;
    a wireless transmission chip electrically connected to the network input port and configured to establish a wireless connection to the modem via the network input port, wherein the wireless transmission chip is a Wi-Fi transmission chip;
    an antenna unit electrically connected to the wireless transmission chip and configured to receive the processed network signals from the wireless transmission chip and transmit the received network signals out, thus providing the function of sharing wireless network and providing the light bulb holder module to be used as a wireless access point (AP);
    a network output port electrically connected to the wireless transmission chip and connected to an external electronic apparatus via a network wire, thus providing the function of sharing wired network, wherein the network output port is a RJ-45 connector;
    a control unit electrically connected to the wireless transmission chip, the light bulb holder module electrically connected to the light bulb slot via the control unit and the light bulb slot configured to receive electricity produced from the utility power;
    an electronic switch electrically connected to the control unit;
    a light bulb holder electrically connected to the electronic switch, the light bulb holder module connected to an external light bulb via the light bulb holder, wherein the light bulb is configured to receive the electricity via the light bulb holder module; and
    a light bulb housing configured to cover the network input port, the network output port, the wireless transmission chip, the control unit, the electronic switch and the light bulb holder, wherein the network input port and the network output port are exposed to a surface of the light bulb housing for connecting the network wire, the antenna unit is installed outside of the light bulb housing, and the light bulb holder is exposed to the surface of the light bulb housing for connecting with the light bulb outside of the light bulb housing;

wherein the light bulb holder module receives the external control signal via the antenna unit outside of the light bulb housing or the network output port and the received control signal is transmitted to the control unit to be processed so that the control unit automatically controls the electronic switch inside of the light bulb housing to be turned on or turned off according to the content of the control signal, thus lightening or extinguishing the light bulb.

8. The light bulb holder module in claim 7, wherein the electronic switch is a relay.

* * * * *